United States Patent
Laurinavicius et al.

(10) Patent No.: US 12,131,481 B2
(45) Date of Patent: Oct. 29, 2024

(54) AUTOMATED TUMOUR-STROMA INTERFACE ZONE DETECTION FOR ANTI-TUMOUR RESPONSE ASSESSMENT BY IMMUNOGRADIENT INDICATORS

(71) Applicant: Vilnius University, Vilnius (LT)

(72) Inventors: Arvydas Laurinavicius, Verbiskiu village (LT); Allan Rasmusson, Vilnius (LT); Ausrine Nestarenkaite, Vilnius (LT); Dovile Zilenaite, Vilnius (LT); Renaldas Augulis, Vilnius (LT)

(73) Assignee: Vilnius University, Vilnius (LT)

( * ) Notice: Subject to any disclaimer, the term of this patent is extended or adjusted under 35 U.S.C. 154(b) by 376 days.

(21) Appl. No.: 17/600,614

(22) PCT Filed: Apr. 9, 2020

(86) PCT No.: PCT/IB2020/053396
§ 371 (c)(1),
(2) Date: Oct. 1, 2021

(87) PCT Pub. No.: WO2020/208571
PCT Pub. Date: Oct. 15, 2020

(65) Prior Publication Data
US 2022/0138955 A1 May 5, 2022

(30) Foreign Application Priority Data
Apr. 9, 2019 (LT) ..................................... 2019 509

(51) Int. Cl.
*G06T 7/00* (2017.01)
*G06T 7/13* (2017.01)
*G06T 7/136* (2017.01)

(52) U.S. Cl.
CPC ................ *G06T 7/13* (2017.01); *G06T 7/136* (2017.01); *G06T 2207/10056* (2013.01); *G06T 2207/30024* (2013.01); *G06T 2207/30096* (2013.01)

(58) Field of Classification Search
CPC . G06T 7/13; G06T 7/136; G06T 2207/10056; G06T 2207/30024;
(Continued)

(56) References Cited

U.S. PATENT DOCUMENTS

2008/0212864 A1 * 9/2008 Bornefalk .............. G06V 10/50
382/132
2015/0309037 A1 10/2015 Nelson
(Continued)

FOREIGN PATENT DOCUMENTS

| WO | 2019020556 | 1/2015 |
| WO | 2015052128 | 4/2015 |

OTHER PUBLICATIONS

Coleman et al Tri-directional gradient operatiors for hexagonal image processing, J. Vis Commun. Image R. 28, pp. 614-626 (Year: 2016).*
(Continued)

*Primary Examiner* — Ping Y Hsieh
*Assistant Examiner* — Xiao Liu
(74) *Attorney, Agent, or Firm* — Koivula & Somersalo, LLC

(57) ABSTRACT

We present a new method to automatically sample the tumour/stroma interface zone (IZ) from microscopy image analysis data. It first delineates the tumour edge using a set of explicit rules in grid-subsampled tissue areas; then the IZ of controlled width is sampled and ranked by the distance from the edge to compute TIL density profiles across the IZ. From this data, a set of novel Immunogradient indicators are
(Continued)

computed to reflect TIL "gravitation" towards the tumour. We applied the method on CD8 immunohistochemistry images of surgically excised breast and colorectal cancers to predict overall patient survival. In both patient cohorts, we found strong and independent prognostic value of the Immunogradient indicators, outperforming methods currently available. We conclude that data-driven, automated, human operator-independent IZ sampling enables precise spatial immune response measurement in the tumour/host interaction frontline for prediction of disease and therapy outcomes.

11 Claims, 13 Drawing Sheets

(58) Field of Classification Search
CPC . G06T 2207/30096; G06T 2207/10024; G06T 2207/10064; G06T 2207/20021; G06T 7/194
See application file for complete search history.

(56) References Cited

U.S. PATENT DOCUMENTS

2017/0285029 A1\* 10/2017 Hanks ............... G16H 50/20
2020/0234442 A1\* 7/2020 Barnes ............ G01N 33/57419

OTHER PUBLICATIONS

Galon et al: Towards the introduction of the 'Immunoscore' in the classification of malignant tumours, J. Pathol 2014, 232:199-209 (Year: 2014).\*

International Search Report and Written Opinion mailed Oct. 15, 2020 for PCT Application No. PCT/IB2020/053396.

Schwen, L.O., et al., Data-Driven Discovery of Immune Contexture Biomarkers. Frontiers in Oncology, 2018. 8.

Harder, N., et al., Tissue Phenomics for prognostic biomarker discovery in low- and intermediate-risk prostate cancer. Scientific Reports, 2018. 8.

Mlecnik, B., et al., The tumor microenvironment and Immunoscore are critical determinants of dissemination to distant metastasis. Sci Transl Med, 2016. 8(327): p. 327ra26.

Jass, J.R., S.B. Love, and J.M. Northover, A new prognostic classification of rectal cancer. Lancet, 1987. 1(8545): p. 1303-6.

Jass, J.R., et al., The grading of rectal cancer: historical perspectives and a multivariate analysis of 447 cases. Histopathology, 1986. 10(5): p. 437-59.

Hendry, S., et al., Assessing Tumor-Infiltrating Lymphocytes in Solid Tumors: A Practical Review for Pathologists and Proposal for a Standardized Method from the International Immuno-Oncology Biomarkers Working Group: Part 2: TILs In Melanoma, Gastrointestinal Tract Carcinomas, Non-Small Cell Lung Carcinoma and Mesothelioma, Endometrial and Ovarian Carcinomas, Squamous Cell Carcinoma of the Head and Neck, Genitourinary Carcinomas, and Primary Brain Tumors. Adv Anat Pathol, 2017. 24(6): p. 311-335.

Hendry, S., et al., Assessing Tumor-infiltrating Lymphocytes in Solid Tumors: A Practical Review for Pathologists and Proposal for a Standardized Method From the International Immunooncology Biomarkers Working Group: Part 1: Assessing the Host Immune Response, TILs in Invasive Breast Carcinoma and Ductal Carcinoma In Situ, Metastatic Tumor Deposits and Areas for Further Research. Adv Anat Pathol, 2017. 24(5): p. 235-251.

Blank, C.U., et al., Cancer Immunology. The "cancer immunogram". Science, 2016. 352(6286): p. 658-60.

Karasaki, T., et al., An Immunogram for the Cancer-Immunity Cycle: Towards Personalized Immunotherapy of Lung Cancer. J Thorac Oncol, 2017. 12(5): p. 791-803.

Van Dijk, N., et al., The Cancer Immunogram as a Framework for Personalized Immunotherapy in Urothelial Cancer. Eur Urol, 2019. 75(3): p. 435-444.

Jang, N., et al., Prognostic Value of Tumor-Infiltrating Lymphocyte Density Assessed Using a Standardized Method Based on Molecular Subtypes and Adjuvant Chemotherapy in Invasive Breast Cancer. Ann Surg Oncol, 2018. 25(4): p. 937-946.

Denkert, C., et al., Tumour-infiltrating lymphocytes and prognosis in different subtypes of breast cancer: a pooled analysis of 3771 patients treated with neoadjuvant therapy. Lancet Oncol, 2018. 19(1): p. 40-50.

Galon, J., et al., Towards the introduction of the 'Immunoscore' in the classification of malignant tumours. J Pathol, 2014. 232(2): p. 199-209.

Galon, J., et al., Cancer classification using the Immunoscore: a worldwide taskforce. J Transl Med, 2012. 10: p. 205.

Rosenberg, S.A. and N.P. Restifo, Adoptive cell transfer as personalized immunotherapy for human cancer. Science, 2015. 348(6230): p. 62-8.

Chraa, D., et al., T lymphocyte subsets in cancer immunity: Friends or foes. J Leukoc Biol, 2019. 105(2): p. 243-255.

Hussain, S.P., et al., Increased p53 mutation load in noncancerous colon tissue from ulcerative colitis: a cancer-prone chronic inflammatory disease. Cancer Res, 2000. 60(13): p. 3333-7.

Fridman, W.H., et al., The immune contexture in human tumours: impact on clinical outcome. Nat Rev Cancer, 2012. 12(4): p. 298-306.

Coussens, L.M. and Z. Werb, Inflammation and cancer. Nature, 2002. 420(6917): p. 860-7.

Parra, E.R., A. Francisco-Cmz, and Wistuba, II, State-of-the-Art of Profiling Immune Contexture in the Era of Multiplexed Staining and Digital Analysis to Study Paraffin Tumor Tissues. Cancers (Basel), 2019. 11(2).

Taube, J.M., et al., Implications of the tumor immune microenvironment for staging and therapeutics. Mod Pathol, 2018. 31(2): p. 214-234.

Whiteside, T.L., The tumor microenvironment and its role in promoting tumor growth. Oncogene, 2008. 27(45): p. 5904-12.

Hanahan, D. and R.A. Weinberg, Hallmarks of cancer: the next generation. Cell, 2011. 144(5): p. 646-74.

Wong, K.M., T.J. Hudson, and J.D. McPherson, Unraveling the genetics of cancer: genome sequencing and beyond. Annu Rev Genomics Hum Genet, 2011. 12: p. 407-30.

Stratton, M.R., p. J. Campbell, and P.A. Futreal, The cancer genome. Nature, 2009. 458(7239): p. 719-24.

\* cited by examiner

AUTOMATED TUMOUR-STROMA INTERFACE ZONE DETECTION FOR ANTI-TUMOUR RESPONSE ASSESSMENT BY IMMUNOGRADIENT INDICATORS

FIELD OF INVENTION

This invention relates to a method of Tumour-Stroma interface zone detection from immunogradient indicators in cancer patients, that can be used to determine the prognosis of patient survival.

BACKGROUND OF THE INVENTION

One of the most prominent discoveries in modern genetics-analysis of the whole human genome sequence—has made it possible to determine specific genetic mutations associated with cancer. This has led to the definition of cancer as a cell disease caused by genetic mutations [1, 2]. Although genetic mechanisms explain many aspects of tumour progression, many hallmarks of cancer, including host immune and inflammatory response, angiogenesis, and metabolic disarrangements evolve in the context of tumour microenvironment (TME) [3]. In particular, a major driving force of local tumour-host tissue interactions are inflammatory and immune cell infiltrates. Solid tumours are infiltrated by both innate immunity cells (natural killer cells, macrophages, neutrophils, phagocytes) and adaptive immunity cells (T lymphocytes, B lymphocytes, and dendritic cells) [4]. Recently, discoveries of the mechanisms by which cancer cells inhibit host anti-tumour immune response and new immuno-modulating therapies have shifted focus towards search for anti-tumour immune response components and biomarkers [5, 6].

Tumour-infiltrating lymphocytes (TIL) and their distributions within TME compartments have been reported as potential prognostic and predictive biomarkers in various types of cancer. Studies in clinical and experimental settings have revealed the prognostic role of CD3+, CD4+, CD8+, and FOXP3+ TIL in many types of solid human tumours such as melanoma, colorectal, breast, lung, bladder, prostate, renal, and hepatocellular carcinomas [5, 7-10]. Since TILs are represented by several subsets of T and B cells with complex interactions and roles, their assessment in the TME requires taking both functional and spatial aspects into account to understand their roles as major components of anti-tumour response [11]. A comprehensive study of colorectal cancer (CRC) immunome by Galon et al. [12], based on digital image analysis (DIA) of immunohistochemistry (IHC) slides, revealed that the densities of CD3+ and CD8+ TIL in the centre of the tumour and the invasive margin (IM) correlate with the outcome of the disease. This discovery led to a clinically validated Immunoscore® indicator, found to be superior to the conventional tumour, node, and metastasis (TNM) staging system [13]. Recent studies have demonstrated prognostic and predictive value of high TIL infiltration in triple-negative and human epidermal growth factor receptor 2 positive breast cancer BC [14, 15]. Intratumoural T cells are considered an important cornerstone in the emerging concept of Immunogram—a comprehensive evaluation of a patient's anti-tumour response guiding immunotherapies in various cancers [16-18].

At the core of any method aiming to obtain a better understanding of tumour immune contexture, is the task of quantifying the individual immune cell subtypes and their location relative to the tumour cells [8, 19, 20]. The enumeration of immune cells in the TME does not only imply accurate detection of the tumour and stroma regions but also a need for a clear and reproducible delineation of the IM [8]. Regardless of whether visual or DIA methods for outlining the IM are applied, the definitions of the IM remain rather ambiguous. An early description of the IM configuration was proposed by Jass in 1986, who studied histomorphological prognostic indicators in rectal carcinoma and defined two different configurations of the IM-expansive (or pushing) and infiltrative. A pushing IM is identified visually when a clear delineation of the tumour and host tissue is possible during examination of the histologic slide. Tumours with an infiltrative IM configuration have a relatively irregular growth pattern where it is difficult to delineate host tissue from tumour cell aggregates [21, 22].

Many other studies used the IM definition by Galon et al.—1 mm wide area around "the border separating the host tissue from malignant glands". However, it does not provide an explicit definition of "the border"; it actually requires an expert's judgement to manually draw it. This remains a source of bias as it leads to inter- and intra-observer variance in tumours with irregular and highly infiltrative growth patterns, and it surely decreases the capacity of analysis, even if other analysis steps are automated. Consequently, the informative power and clinical utility of TIL and other TME-context assays may be underachieved. Recently, Harder et al. also applied a tissue phenomics approach to search for image-based biomarkers in their study of prostate cancer recurrence prediction. In particular, their DIA step utilized morphologic operations to automatically delineate tumour gland/stroma areas and subsequently sample the tumour border as a region reaching equally far to both tumour and stroma regions. Another recent study proposed a data-driven methodology to discover immune contexture biomarkers; however, it included a manual step of tumour area delineation.

In this study, we present a novel set of Immunogradient indicators based on a new method for automated grid-based extraction of the tumour-stroma interface zone (IZ). The method first identifies the tumour edge (TE) using a set of explicit rules based on IHC DIA data. Subsequently, the IZ is extracted and ranked by the distance around the TE to allow computing TIL density profiles across the IZ. The indicators, which express the "toward-tumour gradient", were found to strongly predict overall survival (OS) of hormone receptor-positive BC and CRC patients.

SHORT DESCRIPTION OF THE INVENTION

The output of the system is a set of scores calculated from the Immunogradient indicators and the scores indicate the survival time for a patient.

The input to the system for calculating the Immunogradient indicators is i) information about which type of tissue or tissue slide region each pixel belongs to, and ii) a set of coordinates and a type for each cell identified within the tissue.

To obtain both types of input data, a sample from the cancer tissue may, for example, be obtained after surgical removal of the cancerous tissue. A sample from the cancerous tissue is then sliced into very thin slices which are then subjected to immunostaining, e.g. immunohistochemistry or immunofluorescence. The slice thickness and exact type of immunostaining will depend on cancer tissue type, but for example for breast and colon cancer, it could be done by mounting 3 μm thick formalin fixed paraffin-embedded tissue sections of tumours on positively charged slides, and staining them with antibodies against cytotoxic T cell marker CD8 and counterstaining with haematoxylin. A digital image of the stained tissue sample is then produced, for instance, by brightfield microscopy at ×20 objective magnification. This also could be applied to other types of cancer for example, lung, renal, hepatocellular cancer, melanoma. Furthermore, the method can be applied for non-tumour pathology to measure spatial aspects of biomarkers in any IZ; for example, similar approach can be utilized to obtain inflammatory cell and fibrosis density profiles in the liver lobule/portal tract interfaces to measure the disease activity and chronicity in hepatitis and liver cirrhosis.

The pixel-wise classification of the input may be produced by external digital image analysis tools and passed along as either a new digital image with the same image characteristics (size, resolution, pixel size) but where each pixel denotes tissue class instead of the colour acquired by microscopy. Any finite number of pixel classes may be input to the system; these could be tumour tissue, stroma tissue, necrosis tissue, artefacts (like tissue folds, knife marks, mounting medium (glue)). For instance, the HALO software (version 2.2.1870; Indica Labs, Corrales, New Mexico, United States) includes a neural network classifier which may be trained to identify cancer-specific tissues like tumour, stroma and lymphoid follicles and artefacts and whole slide image regions like necrosis, tissue folds and where no tissue resides, the microscopy glass slide itself.

External DIA tools may also be used to identify the second part of the input, the coordinates and types of cells of interest in the acquired digital image.

To calculate the interface zone, i.e. the region where two or more tissue classes interact, the system first identifies a narrow interaction "edge", which is then later expanded to an interface zone. Of particular interest for cancer prediction is the interface between tumour and stroma for which the method will first find a "tumour edge", which is then subsequently expanded into a tumour/stroma interface zone.

The first step is to sub-sample the pixel-classification by a grid consisting of equally sized grid elements arranged so that they cover the entire region without intersecting any other grid element. This, so-called regular grid, may have grid elements consisting of squares, rectangles, hexagons or any other polygon shape which fulfils the above. Of preference for the interface zone extractions are hexagons due to their optimal representation of changes in all directions. Inside each grid element a set of data variables is collected. This set includes, but is not limited to, area fractions for all pixel classes in the grid element and also counts of how many cells are contained with the grid element for each cell type identified within the tissue. Area fractions are calculated by summing total area of each class within the grid element, either in pixels or by a squared distance unit, and dividing by the area of the grid element given in corresponding units. For example, for cancer, there will preferably be three area fractions, tumour, stroma and a background with all other pixel classes accumulated. All area fractions are between 0 and 1 and inside each grid element, the sum of all area fractions is 1. From the cell counts and area fractions cell densities can be calculated for each grid element; densities by any combination of cell types and area types are possible. For the extraction of the tumour/stroma interface zone, the set of data variables should include the area fractions of each tissue class of interest together with a single area fraction for a common background class of the remaining pixel/tissue classes.

With the area fractions as a basis, the method proceeds to extract the "interface edge" by incorporating two types of information: i) abrupt changes in area fractions across the grid elements and ii) invasive areas where the contents of the classes of interest are of similar density. To identify abrupt changes, the method calculates the norm of the geometric gradient of tissue class areas for each hexagon. The norm of the geometric gradient simply calculates all changes in each tissue class; it does not distinguish between changes caused by different tissue classes in neighbouring grid elements. For example, the norm of the gradient calculates all changes in tumour area, it does not distinguish between, tumour/stroma changes and tumour/background changes. This is important since the tumour/stroma interface zone should not depend on tumour/background changes. To separate the norm of the gradient, the method considers each derivative along the grid element axes separately and calculates a weighting term for the derivatives of tumour area based on relative changes in other tissue classes along these axes. Considering the example with tumour, stroma and background classes and their derivatives along the x-axis, the tumour area derivative is weighted by the absolute derivative of stroma divided by the sum of absolute derivative of stroma and absolute derivative of background. Likewise, the tumour area derivative along the remaining grid element axes are weighted by the absolute derivate of background divided by the sum of absolute derivative of stroma and absolute derivative of background. This separates the tumour area derivative into one part weighted by relative stroma changes and one part which is weighted by the total background changes. This is done for all grid element axes and thus, the norm of the gradient can be separated into the norm of two weighted gradients; one which is the vector of tumour derivatives weighted by stroma and one which is tumour area weighted by background. All three gradients are important to correctly extract the tumour edge and classify the remaining grid elements into tissue classes and interface elements.

For example, for extraction of the tumour-stroma interface zone, this is done by the following steps listed in preferred order:
1. If the norm of the tumour gradient is larger than a preferred threshold, the grid element is deemed to contain abrupt changes; or "being on an edge".
   a. The abrupt changes captured by the norm of the tumour gradient contain changes contributed by all tissue classes adjacent to the tumour. However, it is important to distinguish which tissue classes, since for the TE, only the abrupt changes between tumour/stroma should contribute to the tumour edge; changes between tumour/background must be ignored in further analysis. The exact pair of adjacent tissue classes which "caused" the abrupt changes can be determined by a suitable comparison of the norm of the weighted gradients, for instance maximum. If the largest norm is contributed by the tumour-weighted-by-stroma-gradient, the grid element is deemed part of the tumour edge; otherwise it is henceforth ignored.
2. Grid elements not on an abrupt edge are re-classified as belonging to a particular tissue class by some measure on the area fractions, for instance, since all area fractions in a grid element sum to 1, the maximum is a preferred measure.
3. Grid elements reclassified into one of the classes of interest, e.g. tumour and stroma, are tested for belonging to the invasive part of the tumour edge by checking if their area fractions within the grid element are of similar magnitude. For example, grid elements with similar tumour and stroma area can be decided if the absolute difference between the tumour and stroma area fractions is smaller than a preferred threshold. If so, the grid element is deemed to be part of the TE.

Performing steps 1, 2 and 3 for all grid elements will yield a grid where each element is reclassified into either a tissue class, belonging to the TE or being part of an interface not of interest. For instance, each element in a grid overlaid on a digital image of cancer tissue may be reclassified into tumour tissue, stroma tissue, background, TE (consisting of both tumour/stroma changes) or tumour/background "edge" elements which are not of interest for the interface extraction. The above-mentioned steps can be applied for non-tumour pathology, for example, to extract an edge between normal and/or non-neoplastic epithelium and stroma.

Regarding the size of the grid elements, it can in theory be chosen to be a small as a single pixel or so large that only a single grid element covers the region of interest. If one chooses grid elements width size similar to the image pixels, the interface zone extraction can only take pixel-level features into account (e.g. not invasive regions as in step 3 above), and, conversely, choosing a very large grid element size will not reveal the changes across the specimen with a resolution for a viable TE (e.g. step 1 above). Thus, the grid element size will vary according to application and the preferred size will maximize the information detail extracted for any component used to extract the TE. For the tumour/stroma interface zone extraction in cancer, a hexagonal grid with side length of 65 μm was preferred as it enables incorporating both abrupt changes, tissue classification and invasive regions according to steps 1, 2 and 3 above, respectively.

Subsequent to extracting the TE, the method then augments each grid element with the shortest distance the element is from the TE. This has the effect of ranking the grid elements within each tissue class according to the distance from the TE. Finally, the interface zone is extracted by filtering out grid elements further away from the central TE by some preferred threshold. For instance, one may choose to only keep hexagonal elements closer than 5 hexagons to the TE. Of note is that if some tissue class contain "thin" regions, only the available tissue contributes to the IZ; no neighbouring tissue is forced to be part of the IZ.

An important property of this step is that within the IZ, each choice of rank for each tissue class, e.g. rank 1 in tissue class 2, will contain a set of grid elements. Thus, an entire distribution for each data variable is available for each tissue-rank combination. These distributions could be compared by either statistical testing or by summarizing key features, for instance by mean and standard deviation.

In particular, when considering a pair of tissue classes for which the IZ has been extracted, the ranking can be achieved by negating the distance for one class. For example, in cases where the tumour-stroma interface is of interest, the distances for the stroma could be negated. Summarizing each grid element data variable for each rank makes it possible to investigate how cells and/or cell densities distribute across a "collective" profile between rank-4 in stroma across the TE located at rank 0 and through the tumour ranking from 1 to 4.

After extracting the interface zone, ranking according to the distance from the TE and summarizing data variables in each rank-tissue combination, it is possible to calculate indicators of the profiles across the IZ. Many types of indicators are possible, but for the cancer example with extracted tumour/stroma interface zone, two indicators proved to be strong predictors of the patient's overall survival.

Centre of Mass (CM): originates from physics and calculates the exact coordinate (by rank) where one would need to support the IZ profile to have it remain in perfect balance. If not, the profile will tilt towards either the stroma aspect or the tumour aspect of the IZ. The calculation is simply summing each rank quantity multiplied by its rank value and dividing by total sum of rank quantities.

ImmunoDrop (ID): is simply the ratio between rank quantities in rank-1 and 1. As such this is also a measure of whether the rank quantity tends toward tumour or stroma, but at a much narrower interval.

The CM and ID are preferred for the cancer example as they capture the properties/differences in CD8 density profiles for individual cancer cases. Other indicators may prove optimal for other cancers. This is evident in factor analysis for both BC and CRC cohorts. Subsequently, the individual cases may be stratified by their individual values of the CM and/or ID as primary variables and/or their corresponding factor scores from the factor analysis. Furthermore, the IZ profile indicators may be aggregated by summary statistics of the data variable distributions in the IZ grid elements, to further enhance the statistical power of the method. For instance, for the cancer example, an aggregated IZ CD8 factor score computed as the sum of two factors representing CD8 density level and CD8 density "gradient towards tumour" provided the strongest predictions of overall patient survival in both BC and CRC. A benefit over existing methods is that the Immunogradient indicators enables cancer patient cohort stratification using only a single immunostain (CD8) compared to a requirement of at least double immunostaining. Another benefit was demonstrated by the discovery of a time-dependent prognostic effect in the hormone receptor positive BC patient cohort was revealed with only the IZ gradient-type indicators, but not in the stratification by the CD8+ cell mean density on tumour aspect of the IZ. This finding proves the principle that the Immunogradient indicators have advantages over existing methods of measuring anti-tumour immune response in pathology slides. The specific names for the indicators can be modified depending on the context of the assay, which can be aimed at tasks other than tissue immune response assessment.

DETAILED DESCRIPTION OF THE INVENTION

Figure 1:
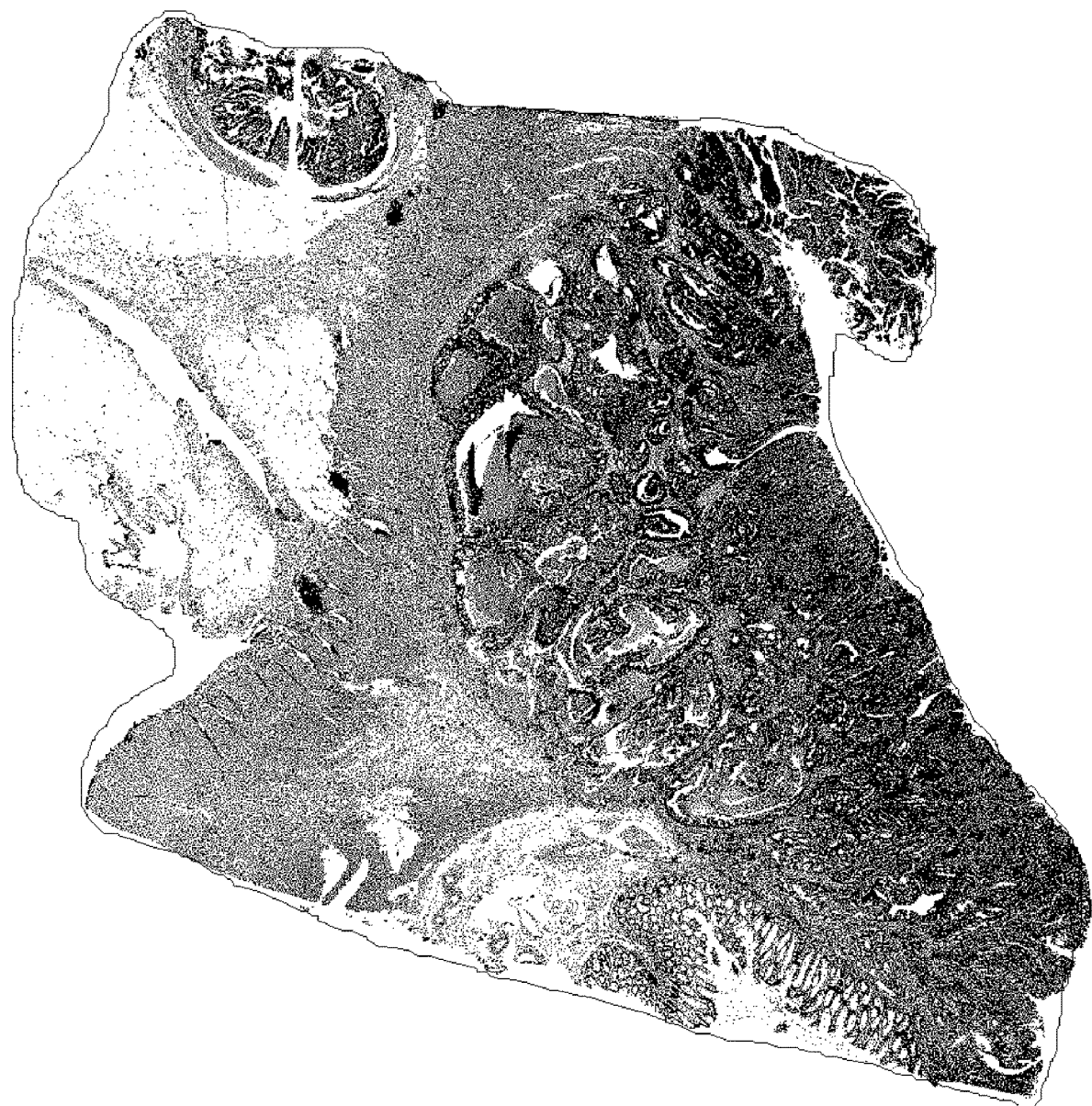
FIG. 1. Whole slide image of CRC tissue CD8 IHC sample converted to black and white. It shows an example of a digital image of a tissue section extracted from a sample of colorectal cancer, then stained histochemically before acquisition by light microscopy.

The procedure for staining and imaging by microscopy was done by mounting 3 μm thick FFPE tissue sections of BC and CRC tumours on positively charged slides (other appropriate microscopy slides can be used), IHC was performed by Roche Ventana BenchMark ULTRA automated slide stainer (Ventana Medical Systems, Tucson, Arizona, USA). Antibodies against cytotoxic T cell marker CD8 (clone C8/144B, DAKO; antibody dilution 1:400) was used followed by ultraView Universal DAB Detection kit (Ventana Medical Systems, Tucson, Arizona, USA). The sections were counterstained with Mayer's haematoxylin. The IHC slides were digitized at ×20 objective magnification (0.5 μm resolution) using a ScanScope XT Slide Scanner (Leica Aperio Technologies, Vista, CA, USA) (FIG. 1). The method can be accomplished on any manual or automated IHC, immunofluorescence, or other microscopy staining and imaging technique that produces data on cancer tissue compartments and biomarker of interest, positioned within the spatial context of the tissue section.

Figure 2:
FIG. 2. CRC tissue image classified per pixel by external tool. The black and white patterns illustrate 5 different tissue classes and how the results of pixel-wise tissue classification by external DIA tools can be passed along as an image where tissue classes are represented by different intensities.

FIG. 2 shows a digital image which, for each pixel, indicates by colour value which tissue class each pixel in FIG. 1 belongs to. This information forms the first of two inputs to the interface zone extraction method and FIG. 2 illustrates how it can be passed to the interface extraction in the form of a digital image, but any representation of tissue class per pixel, e.g. a list of region coordinate values with class type, will do. The method of classification itself is not the concern of the interface zone extraction; it may be performed by existing DIA tools. The example in FIG. 2 was performed using DIA software HALO (version 2.2.1870; Indica Labs, Corrales, New Mexico, United States). Cancer-specific HALO AI tissue classifiers were trained to segment tumour, stroma and background (consisting of necrosis, artefacts, and glass) and tumour, stroma, lymphoid follicles, necrosis and background (consisting of glass and artefacts) in BC and CRC, respectively.

The second input to the method is a list of coordinates of the cell/particles of interest, in any digital representation, e.g. text file, spreadsheet or database etc. For the BC and CRC cohorts HALO's Multiplex IHC algorithm was used to detect and extract coordinates of CD8 positive cells. The data was read from a database.

Figure 3:
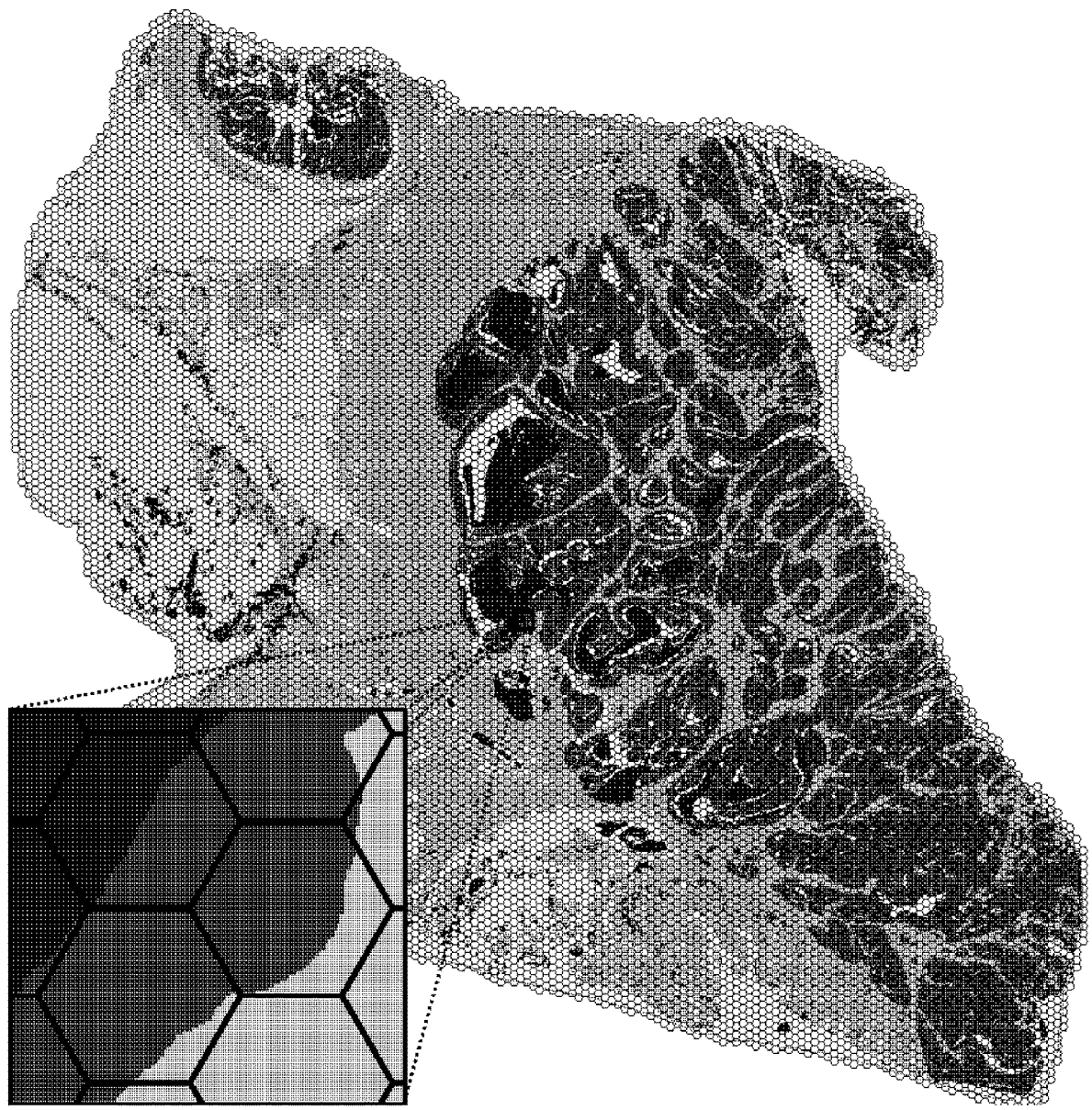
FIG. 3. Classifier image overlaid with grid for subsampling. Insert shows hexagonal grid elements overlaying background, tumour and stroma and illustrates how a regular grid is overlaid on the classifier image in a randomly sampled position. In the example given, the grid elements are regular hexagons with side length of 65 μm.

FIG. 3 illustrates how the pixel-wise tissue classification is sub-sampled using a regular grid on which the tumour edge and interface zone is then extracted. Specifically, the automated pixel-wise classification result in FIG. 2 of the tissue obtained by automated DIA was overlaid by a regular grid with random starting position. The grid element may be squares, rectangle, hexagons or any polygon which allow full covering of the region of interest. Preferably, a hexagonal grid should be applied as it is optimal in representing changes in all directions. The size of the grid elements should be chosen small enough to capture the interface zone changes, but large enough to capture area of infiltrative regions. In FIG. 3 a hexagonal grid with hexagon side length of 65 μm is overlaid in a random position to subsample the DIA results. The type and size of the grid can be fine-tuned for specific tissue, pathology, biomarker expression level and distribution pattern.

Figure 4:
FIG. 4. Accumulation of area fractions of tumour, stroma and background in each grid element. Lighter elements consist mostly of stroma, dark elements mostly of background and intermediate grey levels depict predominantly stroma. It shows how the area fractions of the tissue classed have been accumulated into a subset of classes. Only tumour and stroma are kept, and the remaining classes are collected into a combined background class.

FIG. 4 shows a set of area fraction data variables collected. In general, a set V of data variables is collected inside each grid element. For the interface zone extraction, the variables should include both areas of different tissue classes and counts of segmented cells supplied as second part of the input. For robustness to varying hexagon size, area fractions for each region class are collected inside the grid elements instead of absolute areas.

Regardless of how many region classes were identified by the pixel-wise classifier, only three area fractions are of interest here: tumour area fraction t, stroma area fraction s and background area fraction b combined from the remaining classes extracted by DIA. For any hexagon h, the lookup of data variable $v \in V$ is denoted as $v(h)$; tumour area fraction is $t(h)$, or simply t when h is unambiguous. FIG. 4 illustrates the hexagonal area fractions (t, s, b) as red, green and blue, respectively.

Figure 5:
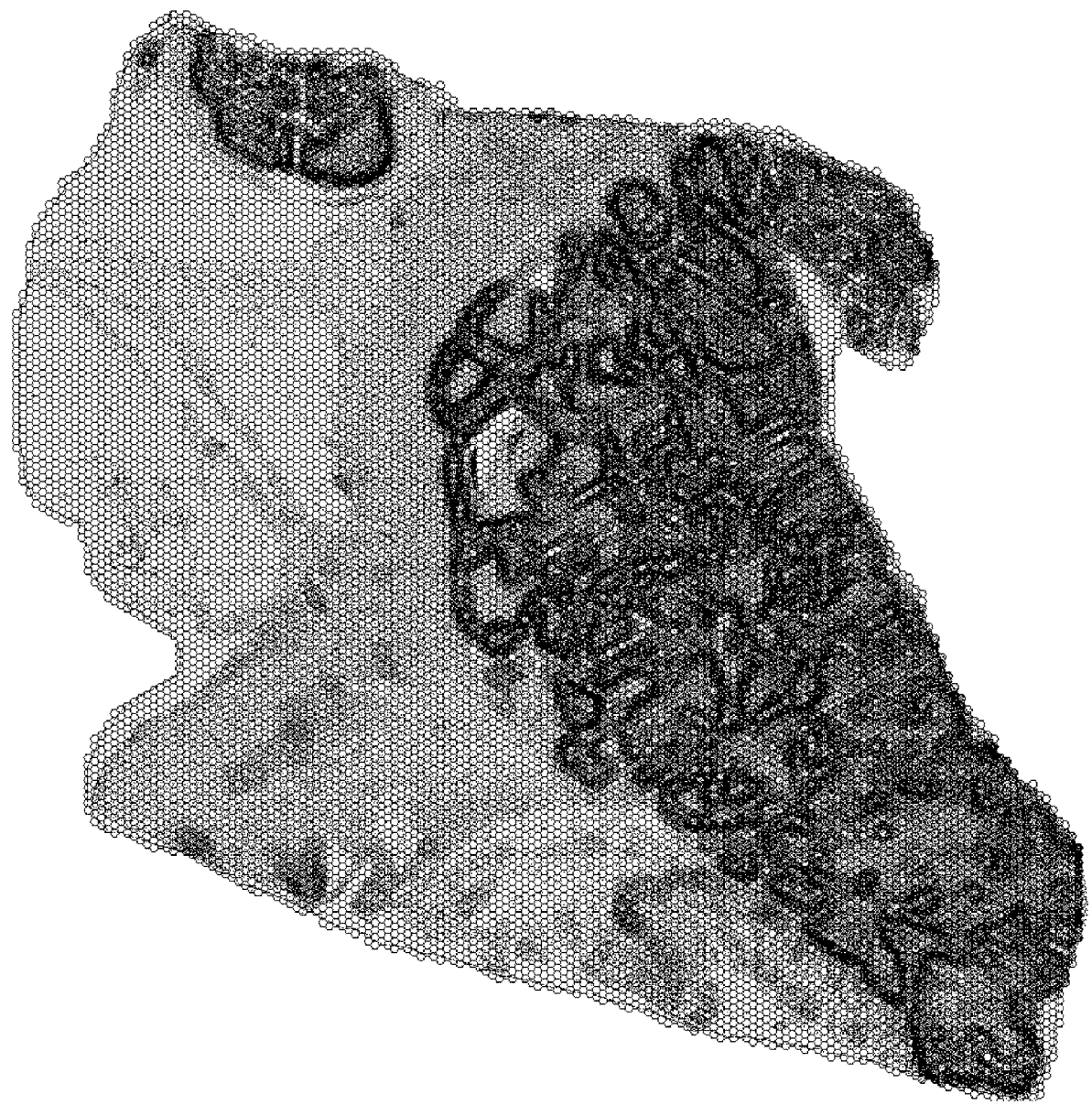
FIG. 5. Tumoral changes within the grid by edge detection depicted by the dark grid elements. It shows the changes in tumour tissue across the grid calculated by the norm of the geometric gradient of the tumour area fractions.

FIG. 5 shows the abrupt changes area calculated for a single tissue class, here the tumour class. The change in any $v \in V$ across the hexagonal grid is calculated by the commonly applied geometrical norm $|\nabla_v(h)|$. To calculate this, derivatives along all grid element axis, e.g. the three hexagonal axes (x, y, z); $d_x^v$ denotes derivative along axis x (at implicit hexagon h) for variable v; so $d_x^t$ is the change of tumour area fraction along axis x. Total change can be calculated by the norm of the gradient. Thus, the total change in tumour area fraction used for interface extraction is (again omitting h):

$$|\nabla_t| = \sqrt{(d_x^t)^2 + (d_y^t)^2 + (d_z^t)^2}.$$

Many numerical methods exist for calculating the gradient, and for hexagonal grids some methods utilize a linear combination between derivatives to optimize for computation speed. This may be adequate, but preferably all derivatives should contribute to the gradient to maximize the level of detail extracted. In FIG. 5, the normalised gradient, denoted $\langle \nabla_t \rangle \in [0; 1]$, is overlaid on the tissue it illustrates how it captures all changes of tumour.

Figure 6:
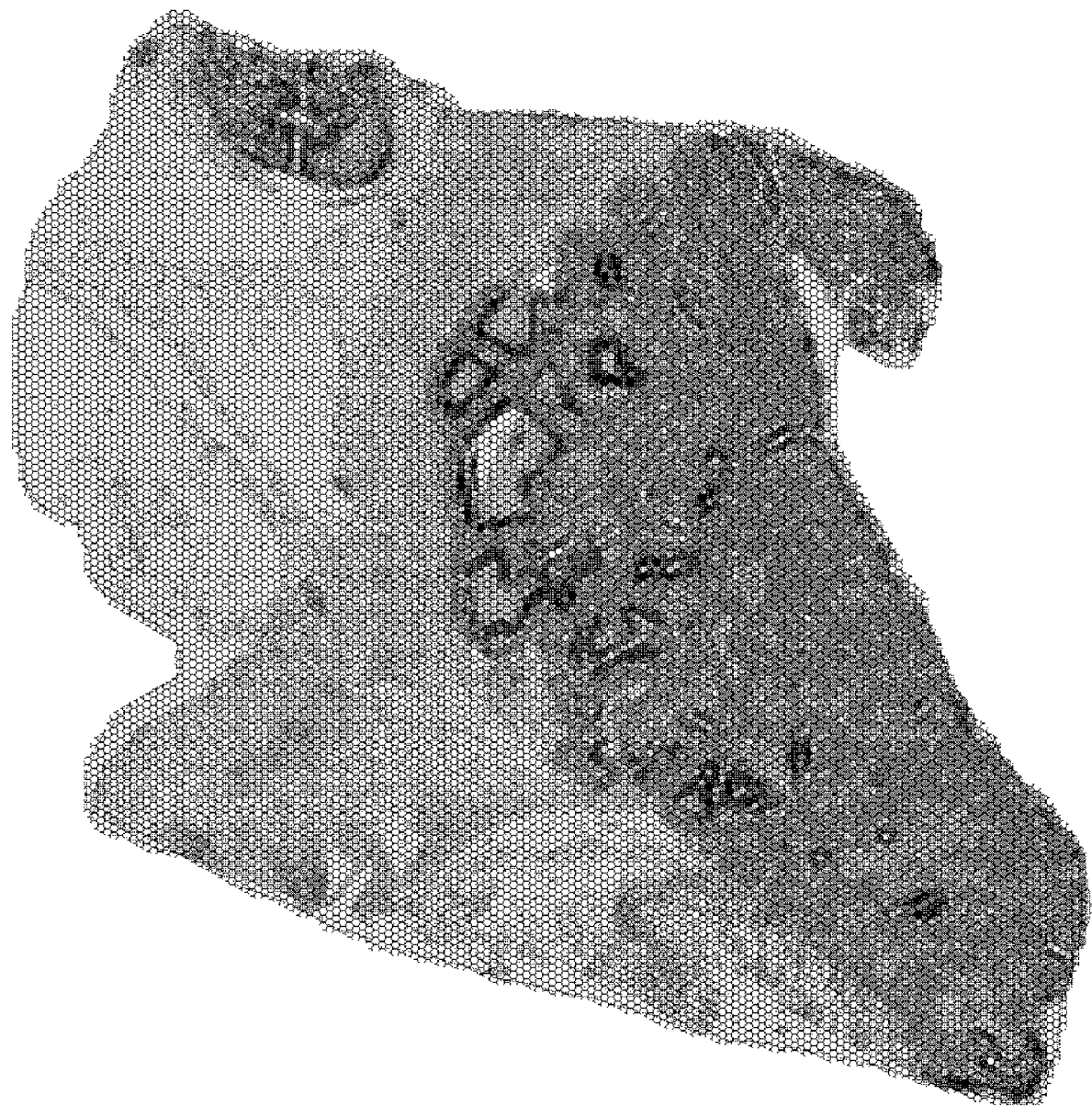
FIG. 6. The results of splitting the changes in tumour into components of tumour/stroma changes and tumour/background changes. Tumour changes separated into tumour/stroma (intermediate grey) and tumour/background contributions (dark intensities). The dark tumour/background edges do not form part of the tumour/stroma edge and will be ignored in after interface zone extraction.

FIG. 6 illustrates the separation of change in tumour into pairs of tumour/stroma and tumour/background changes. For the extraction of the IZ only the tumour area changes due to neighbouring stroma regions are of interest, not changes where tumour is adjacent to background. Thus, the changes in tumour $|\nabla_t|$ are separated into pairs of tumour and possible grid neighbours, a tumour/stroma part and a tumour/background part. This is done by weighting the derivatives of tumour with the relative changes in stroma and background: $d_x^t$ is weighted by relative changes in s and b $$_s d_x^{d_x^t} = d_x^t \frac{|d_x^s|}{\sum_{i \neq t} |d_x^i|} = d_x^t \frac{|d_x^s|}{|d_x^s| + |d_x^b|} \text{ and } _b d_x^{d_x^t} = d_x^t \frac{|d_x^b|}{\sum_{i \neq t} |d_x^i|} = d_x^t \frac{|d_x^b|}{|d_x^s| + |d_x^b|}$$

The rationale is that if, across some hexagon, the amount of background area changes very little, any change in tumour area can be interpreted as being "caused" by change in stroma area and vice versa. Note that $_s d_x^t + _b d_x^t = d_x^t$, which ensures that no information is lost or added; it is merely separated. The separation weights are similar along y and z, and thus total change $|\nabla_t|$ can be separated by s and b:

$$|\nabla_t| = |\nabla_t^s + \nabla_t^b|$$

The separation of tumour changes into tumour/stroma and tumour/background changes is illustrated in FIG. 6 using $|\nabla_t^s| = \sqrt{(_s d_x^t)^2 + (_s d_y^t)^2 + (_s d_z^t)^2}$ as green and $|\nabla_t^b| = \sqrt{(_b d_x^t)^2 + (_b d_y^t)^2 + (_b d_z^t)^2}$ as blue.

Figure 7:
FIG. 7. The results of classifying the hexagons into tissue types and Tumour Edge (TE). Grid elements reclassified to be tumour edge (TE, brightest grid elements), stroma (2nd brightest elements), tumour (2nd darkest elements), background (darkest) or tumour/background contribution (middle intensity).

FIG. 7 shows the grid after all grid elements have been reclassified as belonging to either a tissue class or the Tumour Edge making up the border between the region classes of interest. Specifically, the figure shows stroma hexagons in green, tumour in red, back ground in blue and the Tumour Edge separating tumour and stroma as yellow. The classification of grid elements can be done by existing classification/clustering machine learning methods, but for only a few regions, it may be preferable to manually set clustering thresholds. To consistently group the hexagons into tumour, stroma, background, TE and tumour/background interface, the normalised gradient, denoted $\langle \nabla_v \rangle \in [0; 1]$, is used as a probability for whether a hexagon should be part of the tumour edge TE. Thus, the grid elements are classified by the following steps:

1. Abrupt changes in the tumour area fraction are identified by testing if $\langle \nabla_t \rangle > 0.5$.
   a. For all hexagons where this is the case, the maximum of $\langle \nabla_t^s \rangle$ and $\langle \nabla_t^b \rangle$ will subsequently determine if the hexagon is part of the TE or tumour/background interface, respectively.
2. Grid elements that do not have abrupt changes as decided by step 1a, are grouped into region tissue classes, here tumour, stroma or background by the maximum of area fractions of t, s, and b since the area fraction will always sum to 1 in each grid element:

$$t + s + b = 1,$$

where t, s and b $\in [0; 1]$.
3. Lastly, the invasive regions of the TW are identified in hexagons classified as either tumour or stroma in step 2 which have near-equal area fractions of tumour and stroma. For instance, tumour and stroma hexagons (by step 2) for which $|t-s| < 0.25$ are deemed to have similar amount of tumour and stroma and to be part of the invasive areas of the TE.

The example shows the method adapted to tumour-stroma interface zone in cancer. In general, any preferable threshold can be applied to the norm of the gradient for any tissue class to determine if a grid element is on an edge for that particular class. Depending on biology and purpose, one may choose to keep edges of individual tissue classes, or optionally separate the edge into contribution by neighbouring tissue classes. Likewise, the addition of invasive areas is optional, as is the priority of the chosen criteria for including grid elements in the central edge (tumour edge for cancer).

Figure 8:
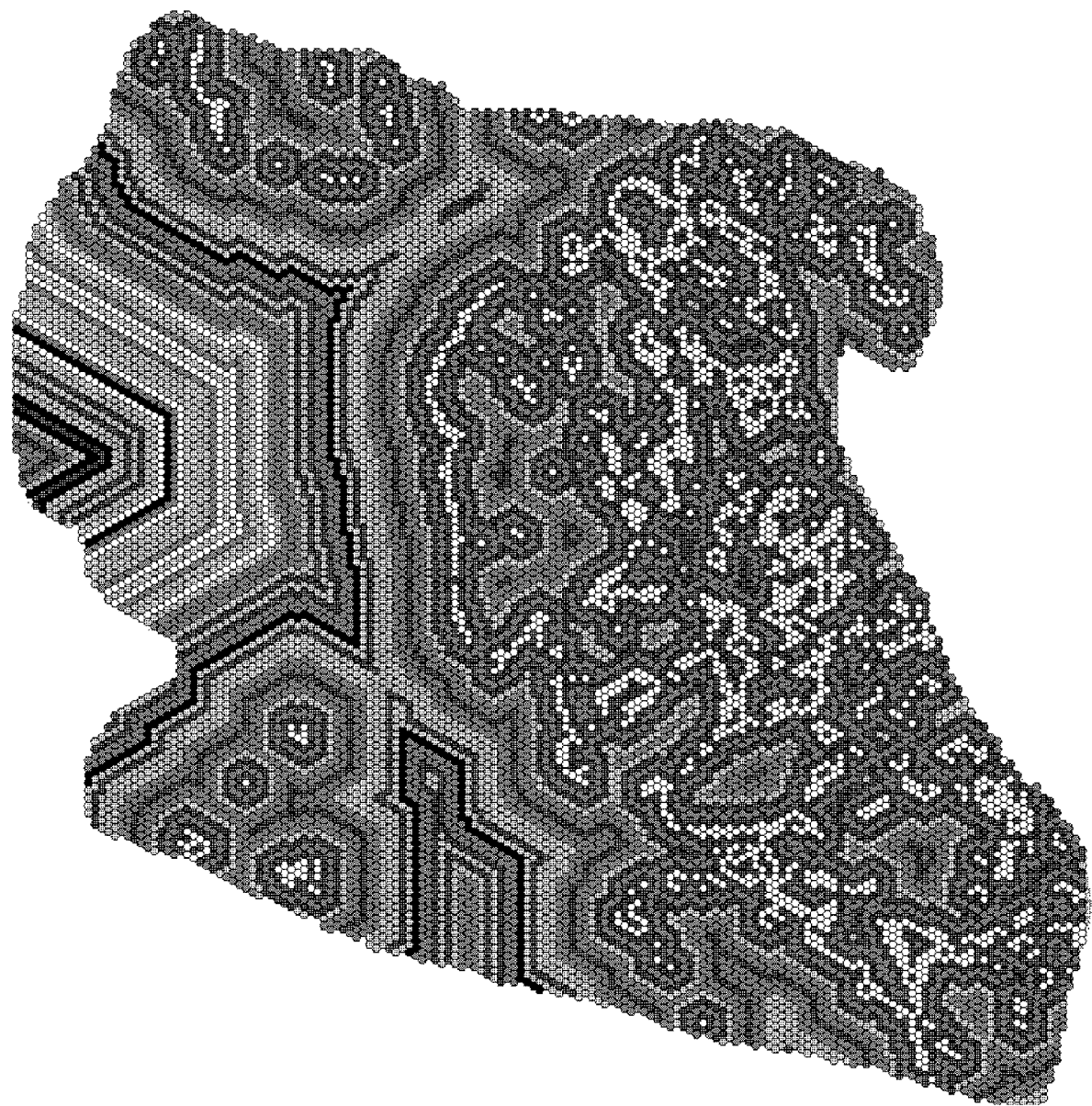
FIG. 8. The results of calculating the shortest distance to the extracted TE for each hexagon. Hexagonal distance to TE (white). Each intensity level shows on distance value.

In FIG. 8, using a simple hexagonal distance transform, each hexagon's shortest distance to the extracted Tumour Edge shown in yellow is computed. The figure shows the distances in the hexagonal grid using a random intensity for each distance value. One has the choice between several distance measures, e.g. Euclidean, but for the example with hexagonal grid elements the distance measures in grid elements proved sufficient.

Figure 9:
FIG. 9. Interface Zone of width 9. TE is comprised of the brightest grid elements; the lighter intensities reflect tumour aspect of IZ and darker intensities show stroma aspect. Completely dark grid elements are not part of the IZ. It is obtained by combining the tissue class of the grid elements with its rank according to distance to TE.

FIG. 9 illustrates the completed interface zone with central TumourEdge in yellow and adjacent tumour aspect in red and adjacent stroma aspect in green. To identify the tumour and stroma aspects of the IZ, ranks are established using the distances calculated and illustrated in In FIG. 8, for any hexagon h, $$\text{rank}(h) \stackrel{def}{=} \begin{cases} \text{if class}(h) = \text{tumour}, & \text{rank} = \text{distance} \\ \text{if class}(h) = \text{stroma}, & \text{rank} = -\text{distance} \\ \text{if class}(h) = TE, & \text{rank} = 0 \\ \text{otherwise}, & \text{ignore } h \end{cases}$$

The extracted TE has rank 0, inside the tumour the rank is simply the positive distance from TE and in stroma it is the negative distance. The remaining tissue classes (background and T/B) are not included in further analyses.

The IZ, now consisting of TE with adjacent tumour and stroma tissue can be defined for different choices of width. Here $IZ_w$ denotes IZ consisting of rank interval $$\left[-\left\lfloor\frac{w}{2}\right\rfloor; \left\lfloor\frac{w}{2}\right\rfloor\right],$$

where $\lfloor \cdot \rfloor$ is rounding to nearest integer towards 0. Similarly, it is possible to define different widths of the central TE by ranks: $TE = TE_1$ consisting of $r_0$ and $TE_3$ consisting of ranks $[-1;1]$ etc. may be relevant for different applications and cancer types. Unless otherwise mentioned, TE will refer to $TE_1$.

Figure 10:
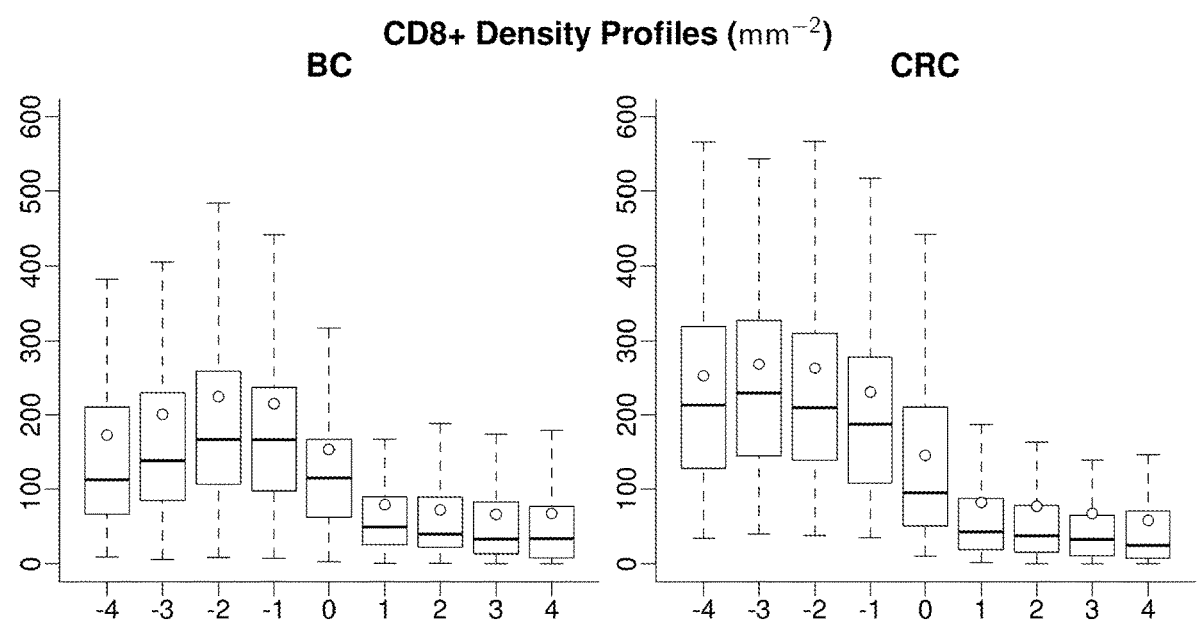
FIG. 10. CD8+ density profiles for BC and CRC cohorts.
Figure 11:
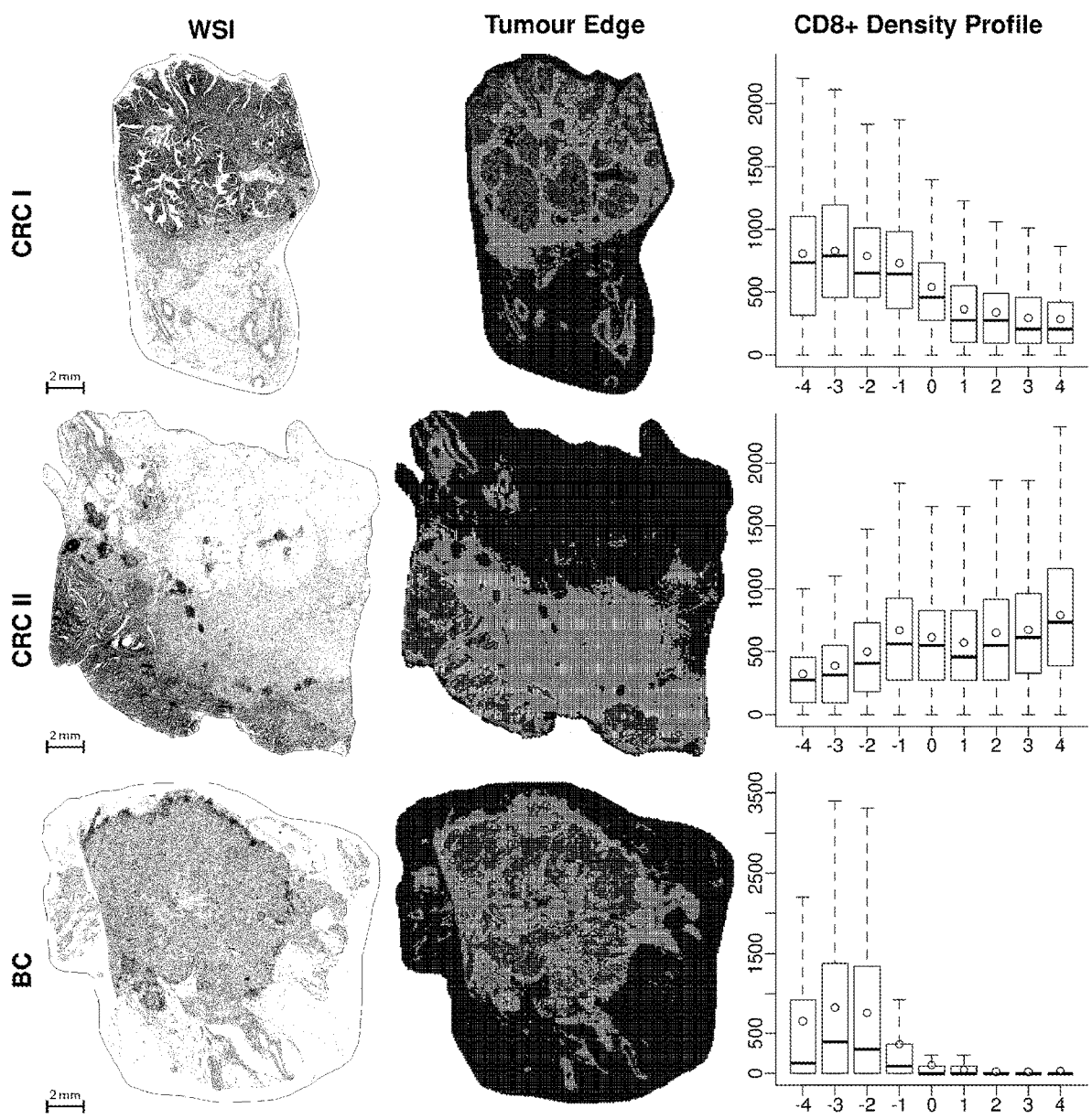
FIG. 11. Examples of interface zone CD8 cell density profiles for individual BC and CRC cases. Different grey level intensities correspond to different grid element classes after clustering in centre column.

FIG. 10 shows how information about cell densities within and across the IZ can be computed by transforming/ summarizing the hexagonal data values for each rank into rank quantities. The rank quantities form a collective interface profile which reveals how cell densities (and other features) vary inside and across the IZ. FIG. 10 shows boxplots of the CD8+ density profiles for both BC and CRC cohorts and FIG. 11 shows the TE and CD8+ density profiles for the individual cases.

The interface zone profiles express the properties of directional variance (gradient) from stroma to tumour aspect. Several indicators of cell density variance within and across the IZ were tested for statistical power to predict OS of the patients. Two cell density indicators were found most powerful:

Centre of Mass (CM):

$$CM(q) = \frac{\sum_{r_i} r_i q(r_i)}{\sum_{r_i} q(r_i)},$$

where $r_i$ indexes all ranks in the IZ, e.g. $r_i \in [-4; 4]$ for $IZ_9$, and $q(r_i)$ denotes choice of rank quantity, e.g. mean of CD8+ cell density. The CM calculates a coordinate along the horizontal axis under which one would have to support the profile for it to remain in perfect horizontal balance. Conversely, it can be understood as a measure of which part of the interface a biomarker gravitates (or has a positive gradient) towards.

Immunodrop (ID):

$$ID(q) = q(r_{-1})/q(r_1).$$

This indicator represents abrupt change in cell density in the immediate vicinity of the TE calculated as the ratio of the quantities in ranks-1 and 1. Since an abrupt drop was frequently observed for CD8+ cell density, the indicator was named Immunodrop. Depending on a particular biology reflected by a specific biomarker, this indicator may reflect corresponding abrupt changes of other tissue properties (e.g., angiogenesis, fibrosis, proliferation) across the IZ.

FIG. 11 illustrates CD8 cell density profiles for individual cases from both the BC and the CRC patient cohorts. The CM and ID proved to be very good indicators as they capture the properties/differences in CD8 density profiles in the individual cancer cases. Other indicators may prove optimal for other cancers.

Figure 12:
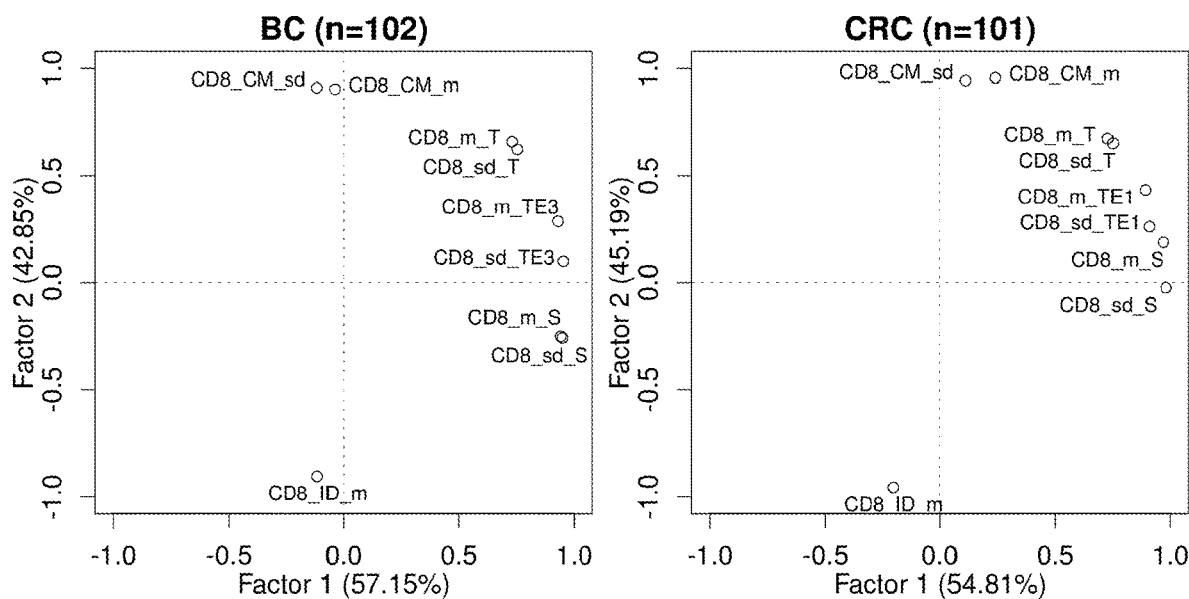
FIG. 12. Factor plots revealing same pattern in both CRC and BC cohorts. Factors 1 and 2 resulting from factor analyses of density profile indicators for both BC and CRC cohorts.

FIG. 12 shows the results of factor analysis for both the BC and CRC patient cohorts. Not only are the CM and ID indicators included, the IZ profile indicators may be aggregated by summary statistics of the data variable distributions in the IZ grid elements, to further enhance the statistical power of the method. From the figure it is evident that the set of Immunogradient indicators can by factor analysis be separated into two orthogonally independent factors. In particular, factor 1 can be seen as representing "CD8 Density Level" and factor 2 represent "CD8 gradient towards tumour" for both BC and CRC cohorts.

Figure 13:
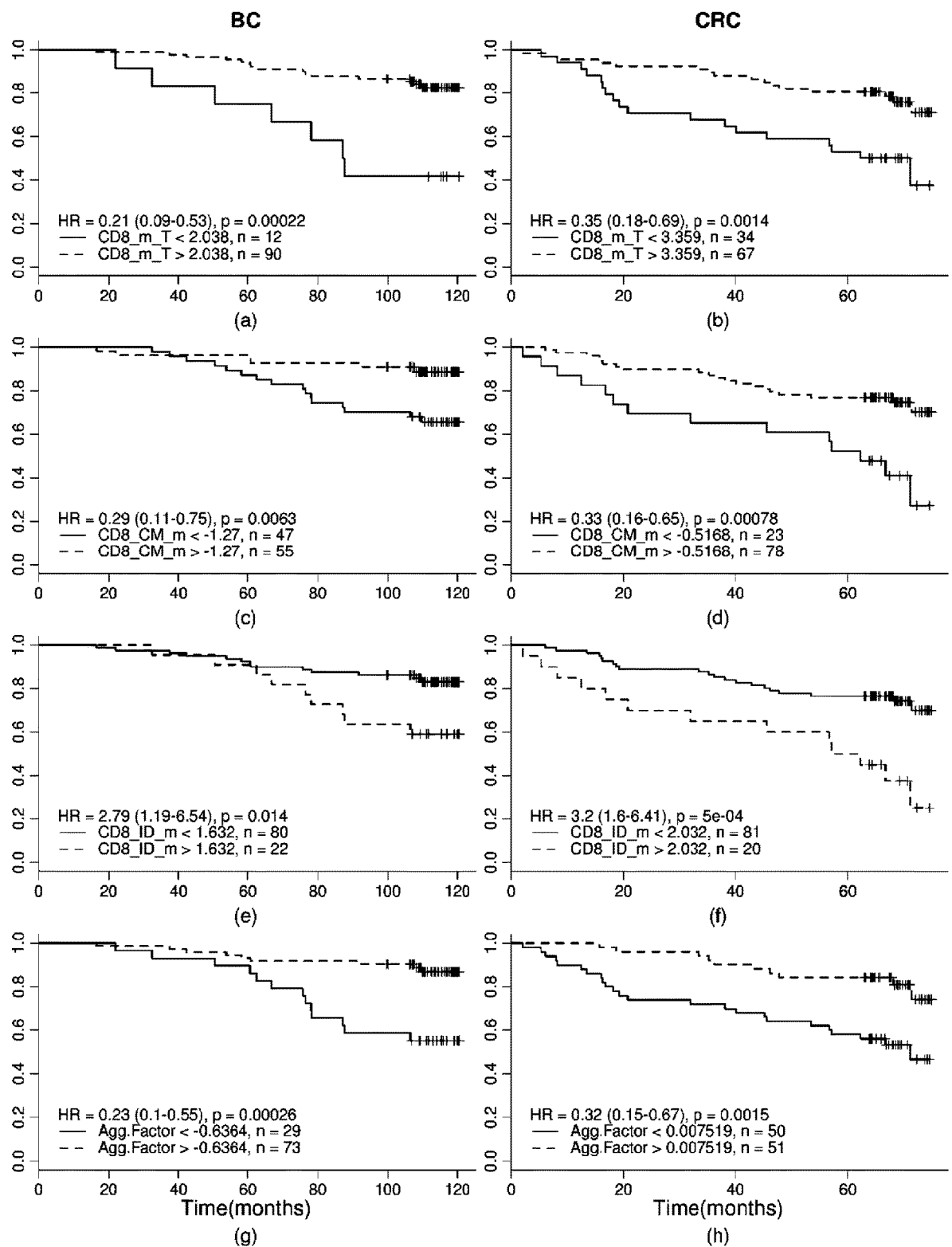
FIG. 13. Kaplan-Maier plots for survival prediction by the density profile indicators.

FIG. 13 shows how the individual cases may subsequent to the factor analysis procedure be stratified by their individual values of the CM and/or ID as primary variables and/or their corresponding factor scores from the factor analysis. Subfigures (g, h) illustrate a particularly good separation by an aggregated factor value computed as the sum of the "CD8 Density" factor and the "CD8 gradient" factor in both patient cohorts.

In particular, a previously unknown time-dependent effect was discovered in the prognostic stratification of the BC patients (FIG. 13(g)): more than 92% of the patients were alive after 5 years from surgery in both groups; however, the OS curves split sharply at this inflection point to end at 87% and 55% OS probability after 10 years in patients with high and low Aggregated IZ CD8+ response factor scores, respectively. Of note, this time-dependent effect is revealed only with the gradient-type indicators (FIG. 13(c, e, g)), but not in the stratification by the CD8+ cell mean density on tumour aspect of the IZ (FIG. 13(a)). This finding emphasises the prognostic power of the Immunogradient indicators, obtained from a surgical excision sample and stained for a single CD8+ IHC, to predict long-term prognosis of patients with this relatively well-managed disease. Furthermore, it implies that anti-tumour immune response properties, that potentially determine the long-term outcome of the disease, are encoded in the TME and captured by the Immunogradient assay. A biologic interpretation of this phenomenon leads to the hypothesis that the individual immune response properties are established in the early stages of BC and are critical to reach full recovery without remaining dormant cancer cells under standard therapies.

In this particular study, the method was validated for prognostic value in two independent cancer patient cohorts with comparable performance and similar findings. The same method can be applied to predict other study endpoints such as disease-free survival, therapy outcomes, both in clinical and experimental settings. In non-tumour pathology, for example inflammatory interface profiles in hepatitis can be correlated to biochemical features of the disease activity or any other study endpoints.

REFERENCES

1. Stratton, M. R., P. J. Campbell, and P. A. Futreal, *The cancer genome*. Nature, 2009. 458(7239): p. 719-24.
2. Wong, K. M., T. J. Hudson, and J. D. McPherson, *Unraveling the genetics of cancer: genome sequencing and beyond*. Annu Rev Genomics Hum Genet, 2011. 12: p. 407-30.
3. Hanahan, D. and R. A. Weinberg, *Hallmarks of cancer: the next generation*. Cell, 2011. 144(5): p. 646-74.
4. Whiteside, T. L., *The tumor microenvironment and its role in promoting tumor growth*. Oncogene, 2008. 27(45): p. 5904-12.
5. Taube, J. M., et al., *Implications of the tumor immune microenvironment for staging and therapeutics*. Mod Pathol, 2018. 31(2): p. 214-234.
6. Parra, E. R., A. Francisco-Cruz, and Wistuba, II, *State-of-the-Art of Profiling Immune Contexture in the Era of Multiplexed Staining and Digital Analysis to Study Paraffin Tumor Tissues*. Cancers (Basel), 2019. 11(2).
7. Coussens, L. M. and Z. Werb, *Inflammation and cancer*. Nature, 2002. 420(6917): p. 860-7.
8. Fridman, W. H., et al., *The immune contexture in human tumours: impact on clinical outcome*. Nat Rev Cancer, 2012. 12(4): p. 298-306.
9. Hussain, S. P., et al., *Increased p53 mutation load in noncancerous colon tissue from ulcerative colitis: a cancer-prone chronic inflammatory disease*. Cancer Res, 2000. 60(13): p. 3333-7.
10. Chraa, D., et al., *T lymphocyte subsets in cancer immunity: Friends or foes*. J Leukoc Biol, 2019. 105(2): p. 243-255.

11. Rosenberg, S. A. and N. P. Restifo, *Adoptive cell transfer as personalized immunotherapy for human cancer.* Science, 2015. 348(6230): p. 62-8.
12. Galon, J., et al., *Cancer classification using the Immunoscore: a worldwide task force.* J Transl Med, 2012. 10: p. 205.
13. Galon, J., et al., *Towards the introduction of the 'Immunoscore' in the classification of malignant tumours.* J Pathol, 2014. 232(2): p. 199-209.
14. Jang, N., et al., *Prognostic Value of Tumor-Infiltrating Lymphocyte Density Assessed Using a Standardized Method Based on Molecular Subtypes and Adjuvant Chemotherapy in Invasive Breast Cancer.* Ann Surg Oncol, 2018. 25(4): p. 937-946.
15. Denkert, C., et al., *Tumour-infiltrating lymphocytes and prognosis in different subtypes of breast cancer: a pooled analysis of 3771 patients treated with neoadjuvant therapy.* Lancet Oncol, 2018. 19(1): p. 40-50.
16. van Dijk, N., et al., *The Cancer Immunogram as a Framework for Personalized Immunotherapy in Urothelial Cancer.* Eur Urol, 2019. 75(3): p. 435-444.
17. Karasaki, T., et al., *An Immunogram for the Cancer-Immunity Cycle: Towards Personalized Immunotherapy of Lung Cancer.* J Thorac Oncol, 2017. 12(5): p. 791-803.
18. Blank, C. U., et al., *CANCER IMMUNOLOGY. The "cancer immunogram".* Science, 2016. 352(6286): p. 658-60.
19. Hendry, S., et al., *Assessing Tumor-infiltrating Lymphocytes in Solid Tumors: A Practical Review for Pathologists and Proposal for a Standardized Method From the International Immunooncology Biomarkers Working Group: Part 1: Assessing the Host Immune Response, TILs in Invasive Breast Carcinoma and Ductal Carcinoma In Situ, Metastatic Tumor Deposits and Areas for Further Research.* Adv Anat Pathol, 2017. 24(5): p. 235-251.
20 Hendry, S., et al., *Assessing Tumor-Infiltrating Lymphocytes in Solid Tumors: A Practical Review for Pathologists and Proposal for a Standardized Method from the International Immuno-Oncology Biomarkers Working Group: Part 2: TILs in Melanoma, Gastrointestinal Tract Carcinomas, Non-Small Cell Lung Carcinoma and Mesothelioma, Endometrial and Ovarian Carcinomas, Squamous Cell Carcinoma of the Head and Neck, Genitourinary Carcinomas, and Primary Brain Tumors.* Adv Anat Pathol, 2017. 24(6): p. 311-335.
21. Jass, J. R., et al., *The grading of rectal cancer: historical perspectives and a multivariate analysis of 447 cases.* Histopathology, 1986. 10(5): p. 437-59.
22. Jass, J. R., S. B. Love, and J. M. Northover, *A new prognostic classification of rectal cancer.* Lancet, 1987. 1(8545): p. 1303-6.
23. Mlecnik, B., et al., *The tumor microenvironment and Immunoscore are critical determinants of dissemination to distant metastasis.* Sci Transl Med, 2016. 8(327): p. 327ra26.
24. Harder, N., et al., *Tissue Phenomics for prognostic biomarker discovery in low-and intermediate-risk prostate cancer.* Scientific Reports, 2018. 8.
25. Schwen, L. O., et al., *Data-Driven Discovery of Immune Contexture Biomarkers.* Frontiers in Oncology, 2018. 8.

The invention claimed is:

1. An automated method for assessment of cell density and biomarker expressions in tumour/host interface zone, wherein the method comprises the following steps:

a) grid-based subsampling of digital image analysis data (DIA) of one or more microscopy images of tissue sections stained by antibodies binding specifically to antigens expressed by immune cells and other inflammatory cells;
b) detecting a tumour edge by combining tissue content and neighbourhood properties of subsampled image analysis data to sample the tumour edge independent of tumour growth pattern;
c) spatial ranking of sub-sampled tissue sections according to tissue content and distance to the sampled tumour edge;
d) extracting an interface zone of variable width, wherein the interface zone contains all ranked tissue sections within the variable width from the tumour edge; and
e) quantifying cell densities, biomarker expressions, and their variances across the interface zone to generate gradient-type indicators expressing a toward tumour-gradient, wherein said gradient-type indicators are selected from one or more of: centre of mass (CM) and immunodrop (ID).

2. The method of claim 1, further comprising aggregating the quantity and gradient indicators to achieve added informative value for specific analysis tasks.

3. The method of claim 1, wherein the gradient-type indicators are based on CD8+ cells density level and density gradient, and wherein in step a) the DIA data is stained by antibodies binding specifically to antigens expressed by CD8+ cells.

4. The method according to claim 1, wherein the method is used for prediction of cancer patient survival.

5. The method according to claim 4, wherein the cancer patient has been diagnosed with cancer selected from colorectal cancer, breast cancer, lung cancer, renal cancer, or melanoma.

6. The method according to claim 1, wherein the method is used for prediction of therapeutic outcomes.

7. The method according to claim 1, wherein in step a) the grid-based subsampling of digital image analysis (DIA) data is based on a hexagonal tiles grid.

8. The method according to claim 1, wherein in step b) the tumour edge detection is based on local changes among grid tiles subsampling pixel-wise-segmented tumour and host tissues, and independently of coordinates of individual tumour and nontumour cells.

9. The method according to claim 1, wherein in step c) the spatial ranking, for obtaining the interface zone between (IZ) the tumour and host tissue areas, is performed independently of coordinates of individual tumour and non-tumour cells, and assigning a distance rank for each tile form the tumour edge extracted in step b0, and using a negative distance rank for tiles being on non-rumor side of the tumour edge.

10. The method according to claim 1, wherein in step d) the interface zone (IZ) variable width is defined by an optional range of the grid tile rank assigned in step c).

11. The method according to claim 1, wherein in step e) the quantifying biomarker expressions, cell densities, and their variances across the interface zone (IZ) are performed in the subsampled grid tiles within each ranked section across the IZ for extracting biomarker and cell density profiles across the IZ, and wherein generating gradient-type indicators expressing toward the tumour gradient, said gradient-type indicators being one or more of: centre of mass (CM) and immunodrop (ID), estimated from the profiles extracted across the ranked IZ sections.

* * * * *